(12) United States Patent
Wiedenman et al.

(10) Patent No.: US 7,739,451 B1
(45) Date of Patent: Jun. 15, 2010

(54) METHOD AND APPARATUS FOR STACKED ADDRESS, BUS TO MEMORY DATA TRANSFER

(75) Inventors: Gregory B. Wiedenman, Woodbury, MN (US); Nathan A. Eckel, Fridley, MN (US); Joel B. Artmann, Otsego, MN (US)

(73) Assignee: Unisys Corporation, Blue Bell, PA (US)

( * ) Notice: Subject to any disclaimer, the term of this patent is extended or adjusted under 35 U.S.C. 154(b) by 741 days.

(21) Appl. No.: 10/331,096

(22) Filed: Dec. 27, 2002

(51) Int. Cl.
*G06F 12/00* (2006.01)

(52) U.S. Cl. ............... 711/118; 711/111; 711/113; 711/114; 711/128; 711/141; 711/145; 711/146; 711/147; 711/151; 711/156; 711/158; 711/165; 710/1; 710/2; 710/3; 710/4; 710/5; 710/6; 710/7; 710/20; 710/21; 710/22; 710/29; 710/36; 710/37; 710/52

(58) Field of Classification Search ............... 711/100, 711/111, 118, 141–147, 151, 156, 158, 165, 711/113–114; 707/205; 710/35–37, 52, 710/58, 1–7, 20–22, 28
See application file for complete search history.

(56) References Cited

U.S. PATENT DOCUMENTS

| | | | | |
|---|---|---|---|---|
| 5,265,228 A | * | 11/1993 | Beaudoin et al. | 710/306 |
| 5,379,381 A | * | 1/1995 | Lamb | 710/6 |
| 5,717,933 A | * | 2/1998 | Mann | 710/262 |
| 5,761,725 A | * | 6/1998 | Zeller et al. | 711/146 |
| 5,954,803 A | * | 9/1999 | Nakai et al. | 710/28 |
| 6,018,788 A | * | 1/2000 | Ichikawa | 711/113 |
| 6,282,638 B1 | * | 8/2001 | Dowling | 712/228 |
| 6,553,487 B1 | * | 4/2003 | Sukonik et al. | 712/228 |
| 6,606,715 B1 | * | 8/2003 | Kikuchi | 714/15 |
| 6,842,837 B1 | * | 1/2005 | Peting et al. | 711/168 |
| 6,871,257 B2 | * | 3/2005 | Conley et al. | 711/103 |

* cited by examiner

*Primary Examiner*—Tuan V Thai
*Assistant Examiner*—Zhuo H Li
(74) *Attorney, Agent, or Firm*—Robert P. Marley; Richard J. Gregson; Charles A. Johnson (57) ABSTRACT

A method and apparatus is presented allowing multiple data pointers or addresses to be transferred without acknowledgment to Memory Controller (506) and Memory Controller (510) of Data Controller (500). Data is then transferred in response to the data pointers from BUFFER (512) and Buffer (514) and may be stalled during the transfer in favor of a second data transfer. Once the second data transfer finishes, the first data transfer may be completed.

12 Claims, 9 Drawing Sheets

METHOD AND APPARATUS FOR STACKED ADDRESS, BUS TO MEMORY DATA TRANSFER

FIELD OF THE INVENTION

The present invention relates in general to data transfer control, and more particularly, to data transfer control directed by multiple data pointers received without acknowledgment.

BACKGROUND OF THE INVENTION

Today's computing architectures are designed to provide the sophisticated computer user with increased Reliability, Availability, and Scalability (RAS). To that end, the rise of the Microsoft Windows NT/2000 operating environment has presented a relatively low cost solution to the traditional high-end computing environment. The introduction of the Enterprise Edition has extended the scalability and resilience of the NT Server to provide a powerful and attractive solution to today's largest and most mission critical applications.

The Cellular MultiProcessing (CMP) architecture is a software/hardware environment that is developing as the enabling architecture that allows the Windows NT/2000 based servers to perform in such mission critical solutions. The CMP architecture incorporates high performance Intel processors using special hardware and middleware components that build on standard interface components to expand the capabilities of the Microsoft Windows server operating systems. The CMP architecture utilizes a Symmetric Multi-Processor (SMP) design, which employs multiple processors supported by high throughput memory, Input/Output (IO) systems and supporting hardware elements to bring about the manageability and resilience required for enterprise class servers.

Key to the CMP architecture is its ability to provide multiple, independent partitions, each with their own physical resources and operating system. Partitioning requires the flexibility required to support various application environments with increased control and greater resilience. Multiple server applications can be integrated into a single platform with improved performance, superior integration and lower costs to manage.

The objectives of the CMP architecture are multifold and may include at least the following: 1) to provide scaling of applications beyond what is normally possible when running Microsoft Windows server operating systems on an SMP system; 2) to improve the performance, reliability and manageability of a multiple application node by consolidating them on a single, multi-partition system; 3) to establish new levels of RAS for open servers in support of mission critical applications; and 4) to provide new levels of interoperability between operating systems through advanced, shared memory techniques.

The concept of multiprocessors sharing the workload in a computer relies heavily on shared memory. True SMP requires each processor to have access to the same physical memory, generally through the same system bus. When all processors share a single image of the memory space, that memory is said to be coherent, where data retrieved by each processor from the same memory address is going to be the same. Coherence is threatened, however, by the widespread use of onboard, high speed cache memory. When a processor reads data from a system memory location, it stores that data in high speed cache. A successive read from the same system memory address results instead, in a read from the cache, in order to provide an improvement in access speed. Likewise, writes to the same system memory address results instead to writes to the cache, which ultimately leads to data incoherence. As each processor maintains its own copy of system level memory within its cache, subsequent data writes cause the memory in each cache to diverge.

A common method of solving the problem of memory coherence in SMP dedicated cache systems is through bus snooping. A processor monitors the address bus for memory addresses placed on it by other processors. If the memory address corresponds to an address whose contents were previously cached by any other processor, then the cache contents relating to that address are marked as a cache fault for all processors on the next read of that address, subsequently forcing a read of system memory. One major difficulty, however, in a multi-processor environment, is overloading the memory bus through the use of bus snooping, which results in a scalability limitation.

Another problem existing within SMP systems, includes the mechanism by which data is transferred. Traditionally, each data pointer received must be acknowledged before use. Additionally, once the data transfer has been started in response to receipt of the data pointer, no other process may be started until the data transfer is complete.

A need exists, therefore, which allows for an unacknowledged stream of data pointers to be received and subsequently used for data transfer. Once the data transfer is underway, a method is required through which the data transfer may be temporarily suspended in favor of another process.

SUMMARY OF THE INVENTION

The present invention is directed to a method and apparatus for facilitating stacked address transfer of data, whereby address pointers are streamed to a memory controller without acknowledgment. The last pointer of the set of address pointers is acknowledged and data corresponding to the address pointers is transferred. If resources for transferring the data becomes exhausted, the present invention allows the transfer of a second data type until such time that the original data transfer may be reinstated.

In accordance with one embodiment of the invention, a method of data transfer is presented. The method comprises transferring data from a first buffer, stalling the data transfer from the first buffer, transferring data from a second buffer in response to the stalled data transfer from the first buffer, and completing the stalled data transfer from the first buffer in response to completing the data transfer from the second buffer.

In accordance with another embodiment of the invention, a multiprocessor system is presented. The multiprocessor system comprises a plurality of multiprocessors sharing a common system bus with access to a common memory pool, and a node controller coupled to each of the plurality of multiprocessors. The node controller comprises a primary data path coupled to the common system bus for transferring data from the plurality of multiprocessors to the common memory pool, and a secondary data path coupled to the common system bus for transferring data from the plurality of multiprocessors to the common memory pool. The secondary data path facilitates data transfer while the primary data path is in a stalled transfer state.

In accordance with another embodiment of the invention, a method of transferring data and data requests is presented. The method comprises allocating storage locations for data storage, receiving a set of data pointers corresponding to the storage locations, transferring the data from the storage locations in response to the set of data pointers, and stalling the data transfer in favor of transferring the data requests.

In accordance with another embodiment of the invention, a system for transferring first and second data types is presented. The system comprises means for buffering the first data type, means for buffering the second data type, means for transferring the first data type, means for delaying the transfer of the first data type, and means for transferring the second data type in response to delaying the transfer of the first data type.

DETAILED DESCRIPTION

Figure 1:
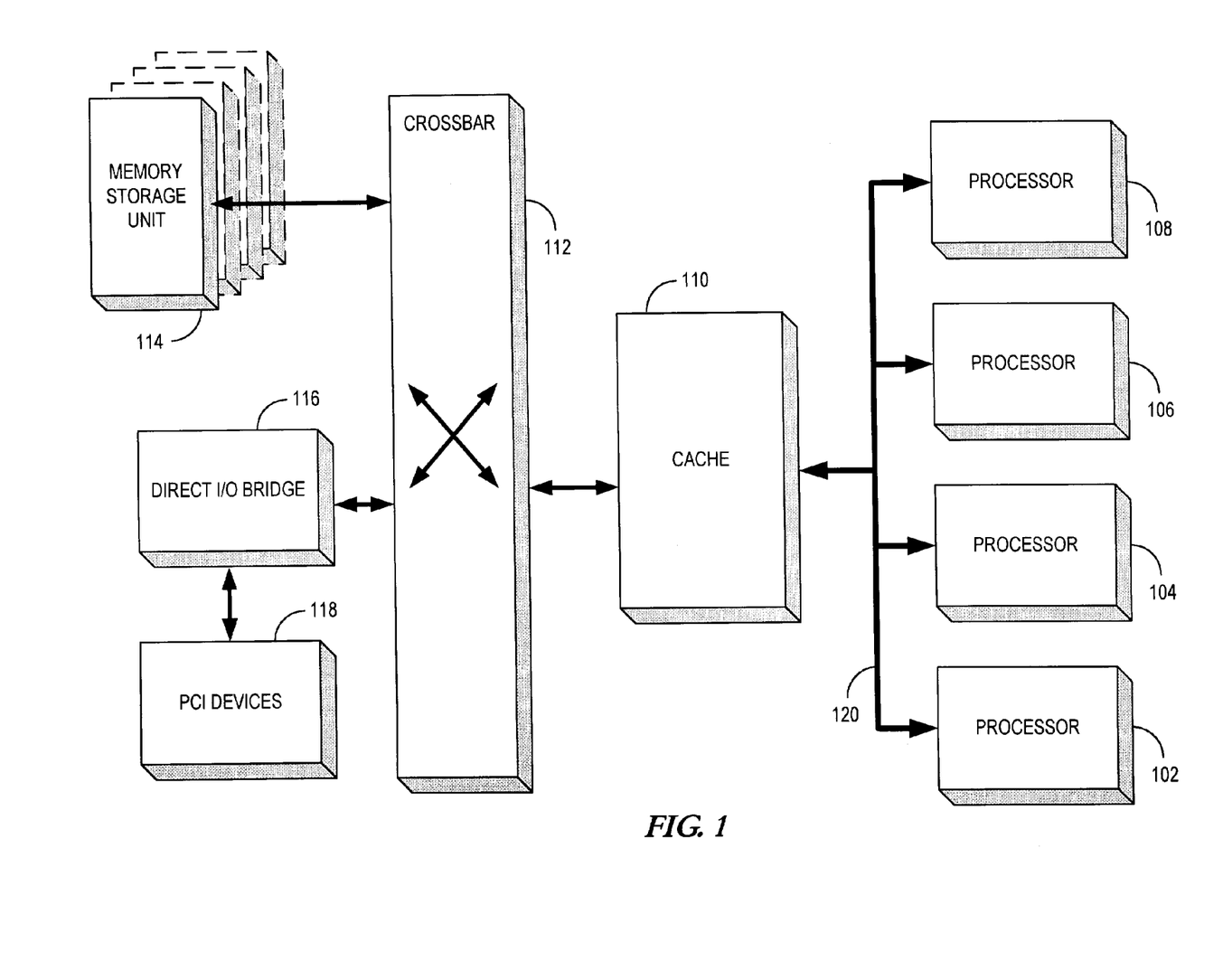
FIG. 1 illustrates a block diagram of a processing cell in accordance with the present invention.

FIG. 1 illustrates an exemplary block diagram of a processing cell in accordance with the present invention. A typical processing cell, or sub-pod, is comprised of multiple Central Processing Units 102-108 and a corresponding Cache 110. The processing units may be of the 128 bit McKinley processor family as produced by Intel Corp., the 64-bit, IA-64 Itanium family, also produced by Intel Corp., or may, for example, be of the 32-bit, Xeon processing family, also produced by Intel Corp. Each of processors 102-108 share Cache no through bus 120, where bus 120 may serve up to, for example, four processors 102-108. Memory Storage Units 114 provides a shared memory pool for processors 102-108 through non-blocking cross-bar 112. Direct IO Bridge 116 provides high-throughput access to Peripheral Component Interconnect devices 118. It should be noted that the present invention is not limited for use with only those processors listed above, but may be used with any processor that is compatible within a multi-processing environment.

Memory Storage Unit 114 may consist of up to four main memory banks each of which may contain a maximum of 16 GigaBytes of Random Access Memory. Likewise, Cache 110 may comprise up to four banks of cache (not shown), each cache bank may contain up to 32 MegaByte of RAM, which is on the order of five times faster than Memory Storage Unit 114 RAM. Each cache bank has a dedicated, direct connection to each of Memory Storage Units 114, each direct connection being supported by crossbar 112. Memory Storage Unit 114 has a typical mainframe design, such that each Memory Storage Unit 114 may handle hundreds of access requests concurrently. Even higher performance may be realized by allowing interleaving between each Memory Storage Unit 114. When interleaving is enabled, data may be spread across all Memory Storage Units 114 and may be accessed in parallel by any one of processors 102-108 and/or cache 110. Crossbar 112 allows for fast, consistently low latency, high bandwidth transmissions between cache 110 and IO bridge 116.

Multiple sub-pods, like the sub-pod illustrated in FIG. 1, may be combined to provide a highly scalable solution for today's demanding enterprise environments in accordance with the present invention. A single configuration of multiple sub-pods, for example, may include a total of 32 processors, along with eight cache modules, 64 GB of main memory, four cross-bars and eight direct I/O bridges to support a total of 96 PCI slots.

Figure 2:
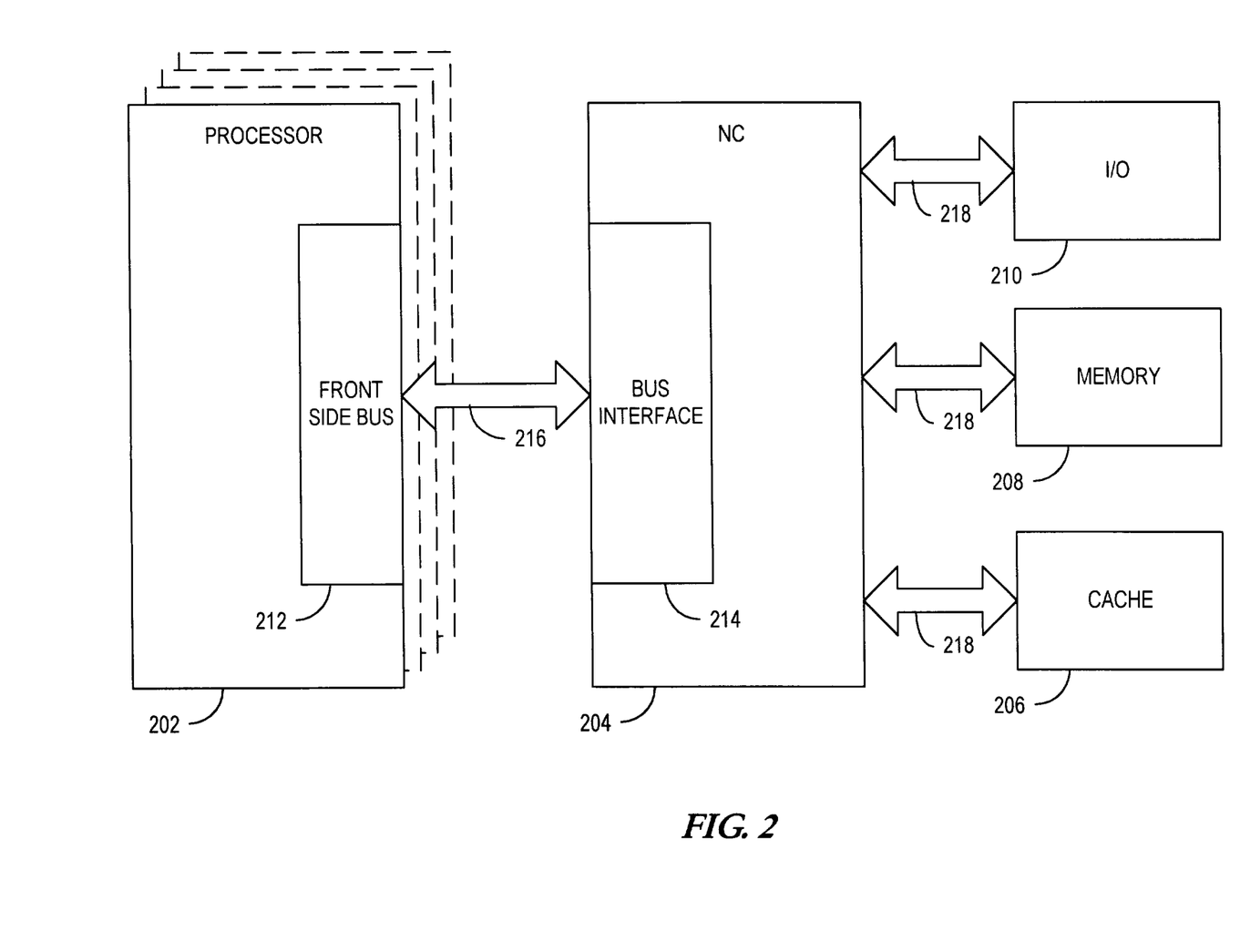
FIG. 2 illustrates a block diagram of the bus interaction of the processing cell of FIG. 1.

FIG. 2 illustrates an exemplary block diagram illustrating bus components within Processors 202 and the associated bus controller required to negotiate bus access by Processors 202 to I/O 210, Memory 208, and Cache 206. Processors 202 each contain Front Side Bus (FSB) 212. Node Controller 204 provides the processor system Bus Interface 214 and cache controller chip for up to four Processors 202 operating on common System Bus 216. Node Controller 204 resides on the sub-pod module and is the central agent on the processor system bus to allow interactions between Processors 202, Cache 206, Memory 208, and I/O 210.

Node Controller 204 facilitates access to Cache 206 providing quick access to commonly used cache lines that are requested on System Bus 216. The data portion of Cache 206 resides in Static RAM (SRAM) that is external to Node Controller 204 and a corresponding on-chip tag RAM keeps track of state and control information for the resident cache lines. In operation, copies of frequently accessed state and control information, called cache blocks or cache lines, are maintained in the SRAM portion of Cache 206. Each cache block or line is marked with a block address, referred to as a tag, so that Cache 206 knows to which part of the SRAM memory space the cache line belongs. The collection of cache tags for each memory block contained within the SRAM is contained within the on-chip tag RAM. For example, if cache line $B_j$ containing data entries $D_j$ is assigned to a portion of SRAM called $M_1$, then $B_j$ is in the on-chip tag RAM and $D_j$ is contained within the SRAM of Cache 206. Cache 206 is a non-inclusive cache, meaning that not all cache lines resident in the processor's cache are necessarily resident Cache 206.

In operation, Node Controller 204 decodes Front Side Bus 212 transactions on System Bus 216 into two main types: 1.) coherent memory requests; and 2.) non-coherent requests. Coherent memory requests are controlled under the MESI protocol throughout the system and Cache 206. Memory within a multiprocessor system in which every memory read and every memory write is instantly known by each processor within the system is known as coherent memory. Coherent memory requests, therefore, must communicate the memory accessed by one processor to the other processors on the bus through the use of a bus snooping function, so that stale data is not used. Coherent memory requests on System Bus 216 are monitored by the bus snooping function and communicated to all Processors 202 on System Bus 216. The non-coherent requests, on the other hand, correspond to requests such as memory-mapped I/O, interrupts, and other special transactions which do not use Cache 206.

Communication between Node Controller 204, I/O 210, Memory 208 and Cache 206 is conducted via interface 218, which is implemented using a crossbar similar to the crossbar discussed in relation to FIG. 1. The crossbar is a multi-input, multi-output, non-blocking electronic switch, where access from Node. Controller 204 and external components is unimpeded, thus removing any potential bottlenecks. The number of Processors 202 operating in conjunction with Node Controller 204 is advantageously limited in order to avoid excessive bus contention on System Bus 216, especially in consideration of the bus snooping function as discussed above.

Data transfer on System Bus 216 may be implemented on varying width buses to include 32, 64 and 128 bit buses and beyond. The clocking rate on System Bus 216 is usually in the range of several hundred MegaHertz (MHz) and data may be transferred on both the rising and falling edges for double-pumped operation of the system bus clock to achieve an effective System Bus 216 bandwidth of several GigaHertz (GHz). In addition, varying phases of the system bus clock may be used to implement even higher effective bus clock rates, such as providing two rising edges and two falling edges within a clock period for a quad-pumped operation of the system bus clock. Processors 202 are responsible for obeying any bus specification that may exist for System Bus 216 between Front Side Bus 212 and Bus Interface 214.

Bus Interface 214 interfaces Node Controller 204 to Front Side Bus 212 for each of Processors 202. Bus Interface 214 provides at least the following functions: 1.) a request queue that allows Node Controller 204 or Processors 202 to generate bus requests; 2.) an in-order queue to receive bus requests from Processors 202; 3.) a snoop interface to provide address and function information necessary to snoop Node Controller 204 tag RAM and then to provide the tag status to the snoop interface; 4.) response cycle generation to complete bus operations; 5.) generation of deferred phase operations; and 6.) a data transfer interface to provide the control and necessary data queues to transfer data bus reads, writes, interrupts and special transactions.

Figure 3:
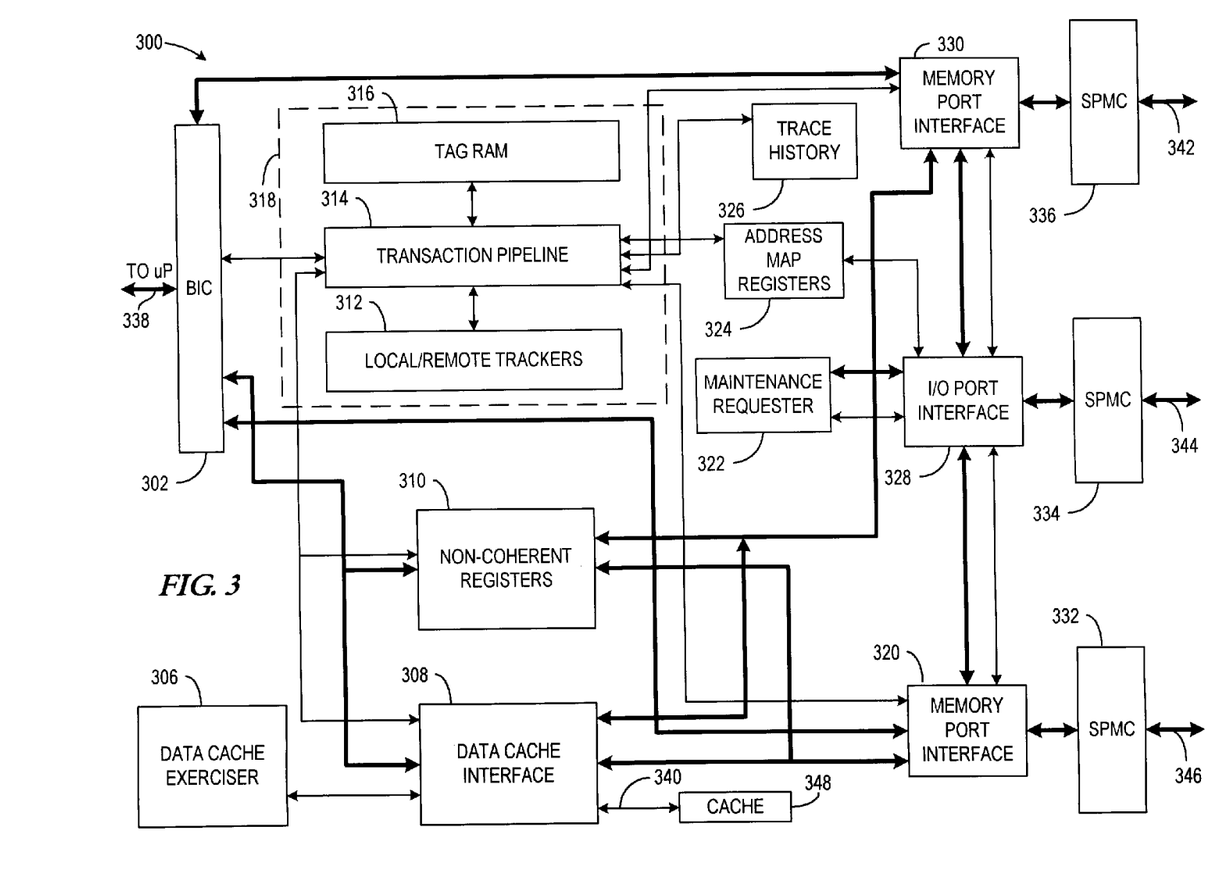
FIG. 3 illustrates a block diagram of a node controller in accordance with the present invention.

FIG. 3 illustrates an exemplary block diagram of Node Controller 300 in accordance with the principles of the present invention and is interconnected as follows. Bus Interface Controller 302 connects to System Bus 338, which is the system bus for the processors attached to the particular sub-pod of interest. Bus Interface Controller 302 interconnects through a data bus to Memory Port Interfaces 320 and 330 as well as to Data Cache Interface 308. Transaction Processor 318 is comprised of Tag RAM 316, Transaction Pipeline 314 and Local/Remote Trackers 312. Tag RAM 316, Transaction Pipeline 314 and Local/Remote Trackers 312 are each interconnected through a control bus and Transaction Pipeline 314 is interconnected to Bus Interface Controller 302 through a control bus. Transaction Pipeline 314 also provides control through a control bus to Address Map Registers 324, Trace History 326, Memory Port Interfaces 330 and 320. A data bus interconnects Bus Interface Controller 302 and Non-Coherent Registers 310 and Data Cache Interface 308. A data bus also interconnects Non-Coherent Registers 310 and Data Cache Interface 308 to Memory Port Interfaces 320 and 330. Data Cache Interface 308 is interconnected to Cache 348 that may be separately located, e.g. off-chip, from Data Cache Interface 308. Maintenance Requestor 322 and I/O Port Interface 328 are interconnected by both a data bus and a control bus. A control bus interconnects Address Map Registers 324 to I/O Port Interface 328. Data and control bus interfaces exist between I/O Port Interface 328 and Memory Port Interfaces 320 and 330. Scalability Port Mega Cells 332, 334, and 336 interconnect through a data bus to Memory Port Interface 320, I/O Port Interface 328, and Memory Port Interface 330, respectively. Data buses 342 and 346 interconnect Scalability Port Mega Cells 336 and 332, respectively, to the respective Memory Storage Unit associated with the particular sub-pod assembly. It should be noted that dual data Buses 342 and 346 are provided to Node Controller 204 to allow for fault tolerant functionality, parallel processing, etc. Scalability Port Mega Cell 334 transfer data between I/O Port Interface 328 and PCI devices 118 as depicted in FIG. 1 and I/O devices 210 as depicted in FIG. 2.

In operation, Node Controller 300 provides all the necessary functions required to facilitate processor bus operations on System Bus 338. In particular, Node Controller 300 facilitates at least seven primary functions: 1.) Out-Going Queue for outgoing requests to be sent out to Bus Interface Controller 302; 2.) In-Order Queue for incoming requests from Bus Interface Controller 302; 3.) Response Control for all bus requests; 4.) Datapath for data transfer and control between Memory Storage Units; 5.) I/O interface module to facilitate access to PCI devices; 6.) History Stack for Bus Interface Controller 302 history capture; and 7.) Error Checking to collect and check all errors. The other major interfaces accommodated by Node Controller 300 include the Bus Interface Controller 302 to Transaction Pipeline 314 interface which handles control signals and address/function signals, data transfers between Bus Interface Controller 302 and Data Cache Interface 308, data transfers between Bus Interface Controller 302 and Memory Storage Unit 0 (not shown) on interface 342, data transfers between Bus Interface Controller 302 and Memory Storage Unit 1 on interface 346 and non-coherent data transfers between Bus Interface Controller 302 and Non-Coherent Registers 310.

The Out-Going Queue function receives requests to be sent to Bus Interface Controller 302 from either Transaction Pipeline 314, Memory Port Interface 330, or Memory Port Interface 320. The requests are individually strobed into a priority selection block (PSB) 490 (see FIG. 4) which acknowledges and grants execution of the request according to a prioritized selection algorithm, or held for later processing within the Out-Going Request Queue. Each of the requesting entities places information concerning the request type, which may be represented by a 3-5 bit digital code identifying one of a number of possible request types. Likewise, an In-Order Queue is utilized to store requests received from the processor on Bus Interface Controller 302 pertaining to, for example, snoop requests or write transactions sent from the processor.

The request signals comprise, for example, an active low address field used to identify the recipient of the request as well as a parity field to maintain an even number of active low signals on the address bus. Likewise, the request field is maintained with even parity by an associated request parity bit. The lower three bits of the address field are mapped into byte enable signals, which allows for a programmable number of bytes to be transferred in a given transaction. The programmable number of bytes for transfer in a single clock transition is, for example, 0 to 8 bytes.

Response signals are generated in response to the requests received and provide status for the requests that have been received. Each response signal comprises a response status field, whose parity is held even by a response parity field. Additionally, a Target Ready bit is maintained within the response signal to allow the receiving party to signal its readiness for write data or writeback data, if a data write is appropriate for the particular request. For transactions with an implicit writeback, the Target Ready bit is asserted twice, first for the write data transfer and second for the implicit writeback data transfer.

Data response signals control the transfers of data on System Bus 338. The agent responsible for transferring data on the data bus is responsible for indicating that data on the bus is valid and that the data should be latched. The data bus agent, for example, should assert a ready bit at both the rising edge and falling edge of the bus clock for double-pumped operation. Additionally, the ready bit may be deasserted by the transmitting entity in order to insert wait states into the data phase. System Bus 338 may represent, for example, a 32, 64, or 128 bit width and may be enabled for individual bytes within bus 338. For example, if System Bus 338 is 64 bits wide, then the bus is capable of transferring 8 bytes of data at a time, where each byte equals 8 bits. A 3-bit byte enable field, for example, could then be used to provide information as to which bytes of data are valid on the 64-bit bus. Additionally, the data transferred on System Bus 338 may be Error Correction Coded regardless of which bytes are enabled.

Figure 4:
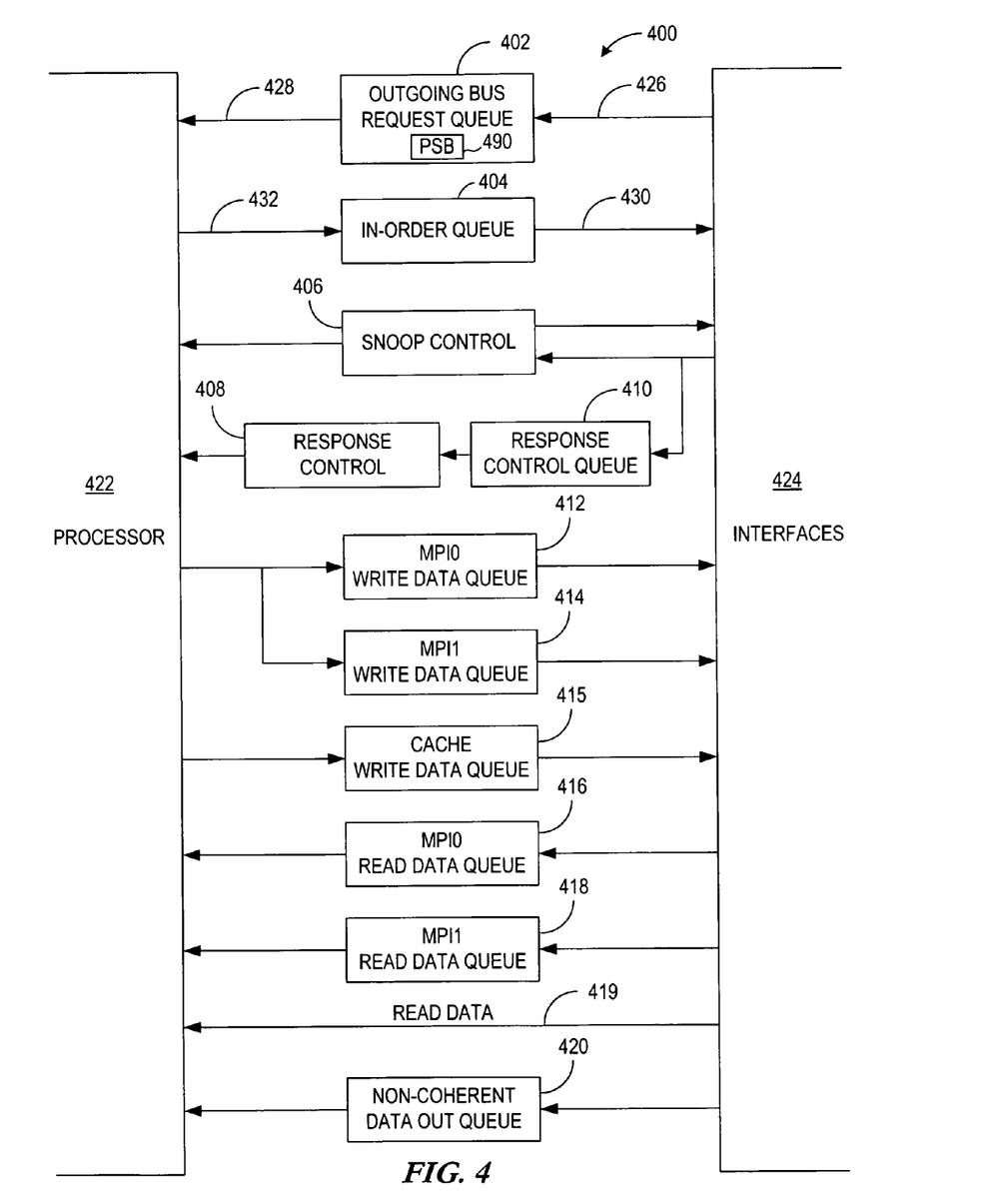
FIG. 4 illustrates a functional block diagram of the bus interface controller of FIG. 3.

FIG. 4 illustrates an exemplary functional block diagram 400 of Bus Interface Controller 302 as illustrated in FIG. 3. Processor 422 may represent one of many processors adapted to contemporaneously interface with other modules/interfaces 424 of the system, such as to the memory interface, cache interface, pipeline, etc. Generally speaking, there exist five phases of operation of Bus Interface Controller 302: 1.) Arbitration; 2.) Request; 3.) Snoop; 4.) Response; and 5.) Data. Arbitration phase operation of Bus Interface Controller 302 allows for one of Processors 422 to obtain control of System Bus 338, or alternatively to allow other Interfaces 424 to obtain control of System Bus 338, during one or more bus clock cycles. Arbitration phase is entered when one of Processors 422 asserts a bus request signal or another interface 424 asserts the bus request signal. A number of agents may simultaneously arbitrate for the request bus, where Processors 422 represent symmetric agents and the other interfaces 424 represent priority agents. Owning the bus is a necessary pre-condition for initiating a transaction. The symmetric agents arbitrate for the bus based on a round-robin rotating priority scheme. Priority agent bus requests override symmetric agent bus requests, where the priority agent bus request is always the next bus owner. The response to the bus request signal is assertion of a bus priority signal to the requesting device having priority, thereby relinquishing control of the bus to either the symmetric agents or the priority agent. Bus blocking control may be asserted by any of the bus agents to block further transactions from being issued to the request bus, in such instances, for example, when system resources, such as address and data buffers, are about to become temporarily busy or filled and cannot accommodate another transaction.

The request phase of Bus Interface Controller 302 is entered when either Processors 422 or Interface 424 modules have successfully arbitrated for bus control. With reference to both. FIGS. 3 and 4, request signals may be provided by Transaction Pipeline 314, Memory Port Interface 330, and Memory Port interface 320 via interfaces 424, and bus request signals may be provided by Processor 422 in order to generate snoop requests. Assertion of an address strobe signal defines the beginning of the request transaction. An active low address is provided along with the address strobe signal as part of the request. The low three bits are mapped into byte enable signals to accommodate, for example, 0 through 8 byte transfers per clock cycle. Even parity is used to insure that an even number of active low signals exist throughout the entire request signal.

Outgoing Bus Request Queue 402 receives bus requests from one or more modules/interfaces 424 via interface 426 and provides the requests via Interface 428 to the addressed Processor 422 of the request. Likewise, In-Order Queue 404 receives bus requests from Processor 422 via interface 432 and provides the bus requests to the addressed recipient via bus 430. Each of Outgoing Bus Request Queue and In-Order Queue is limited, for example, to a depth of 8 and are responsible for queuing up requests from Interfaces 424 and Processor 422, respectively. Handshake signals are used between Outgoing Bus Request Queue 402 and modules/interfaces 424 and also between In-Order Queue 404 and Processor 422 in order to throttle the number of requests received by each of Queues 402 and 404. Additional signaling is provided by Outgoing Bus Request Queue 402 when the queue has been filled to a predetermined depth. If, for example, the predetermined depth is 5 and the overall queue depth is 8, then 3 extra slots are provided in Outgoing Bus Request Queue 402 to allow for potential requests that may be waiting in Transaction Pipeline of FIG. 3. Each of Processors 422 monitors the In-Order Queue 404 and will stop sending requests when the queue is full.

Snoop phase operation is controlled through the combined operation of In-Order Queue 404 and Snoop Control 406 and is required to maintain cache coherency. With regard to FIGS. 2 and 3, Memory Port Interfaces 330 and 320 provide write and read access to, for example, Memory 208. Memory reads are cached into Cache 348 by Data Cache Interface 308, whereby subsequent access to the same memory space results in a memory read from Cache 348 instead of a memory read from Memory 208, resulting in a shorter memory access time. Memory 208, however, represents shared memory space to each Processor 422. Data read from Memory 208 and subsequently cached during one clock cycle from a first Processor 422 may be invalidated by a subsequent write to the same address in Memory 208 by a second Processor 422.

Snoop Control 406 is, therefore, used to provide snoop control of Cache 348 to Processors 422, while In-Order Queue 404 receives snoop requests from Processors 422. In operation, snoop signals from Snoop Control 406 allow Processors 422 to determine whether: 1.) an unmodified, requested cache line exists within Cache 348, resulting in a cache hit; 2.) a modified, requested cache line exists within Cache 348, resulting in a cache hit to a modified cache line; or 3.) no cache line exists within Cache 348, resulting in a cache miss. The snoop signals from Snoop Control 406 are used to maintain cache coherency at the system level and, therefore, provide an indication that the on-chip cache line within the snooping agent, e.g., Processor 422, is valid or invalid, whether the Cache 348 line is in a modified, or dirty, state or whether the transaction should be extended until such time that a valid snooping state may be determined.

The response phase of Bus Interface Controller 302 is controlled by Response Control Queue 410 and Response Control 408 and are responsive to requests received by In-Order Queue 404. A responding agent within the modules/interfaces 424 is responsible for processing requests at the top of In-Order Queue 404, where the responding agent is the agent being addressed by the request, e.g., Memory Port Interface 330 during a memory read of Memory 208 of FIG. 2 or alternately a memory read of Cache 348, if cached memory is present. Each response contains a response identifier, which is used to provide a response code to be placed on System Bus 338 during the response phase of Bus Interface Controller 302. The response code identifies, for example, a result of a bus snoop initiated by one of Processors 422. The results of the bus snoop may indicate, for example, that normal data was found, that no data was found, that the request is to be deferred, or that the request is to be retried. It should be noted that if the response code indicates that either a retry or deferral is necessary and that Snoop Control 406 indicates that Cache 348 is in a modified state, then the retry or defer response code will be implicitly changed to an automatic writeback from Memory 208 of FIG. 2, where Cache 348 will provide itself as a target to maintain data coherency between Cache 348 and Memory 208.

The data phase of Bus Interface Controller 302 operates to transfer data between Memory Port Interface 320 and related Memory Port Interface 0 Write Data Queue 412 and Memory Port Interface 0 Read Data Queue 416 and between Memory Port Interface 330 and related Memory Port Interface 1 Write Data Queue 414 and Memory Port Interface 1 Read Data Queue 418. Cache data may also be transferred from the Processor 422 to cache via the Cache Write Data Queue 415, and to the Processor as shown on path 419. Non-coherent Data Out Queue 420 operates to transfer data contained from local registers within interfaces 424 to Processors 422. A byte enable field may be used to enable multiple data bytes on the data bus per transfer cycle.

An important feature of the present invention involves the data phase of Bus Interface Controller 302 of FIG. 3 and particularly in relation to Write Data Queue 412 for MPI0 and Write Data Queue 414 for MPI1 of FIG. 4. Processors 202 of FIG. 2 transmit data to Memory 208 of FIG. 2 during the data phase of Bus Interface Controller 302 and according to one embodiment of the present invention, do not require an acknowledgment after each transmission. Rather, a stream of information may be transmitted from Processors 202 to Memory 208 of FIG. 2 according to the size of the particular memory block being transmitted. A buffer is allocated to receive the data stream during the snoop phase of Bus Interface Controller 302 of FIG. 3, the buffer being able to accommodate, for example, an 8 word data transfer. Further, the 8 data words transmitted during the data phase may be retrieved from the buffer in any order. That is to say, that first in data may be retrieved first, first in data may be retrieved last, or data may be retrieved in any order, regardless of the order of receipt.

Figure 5:
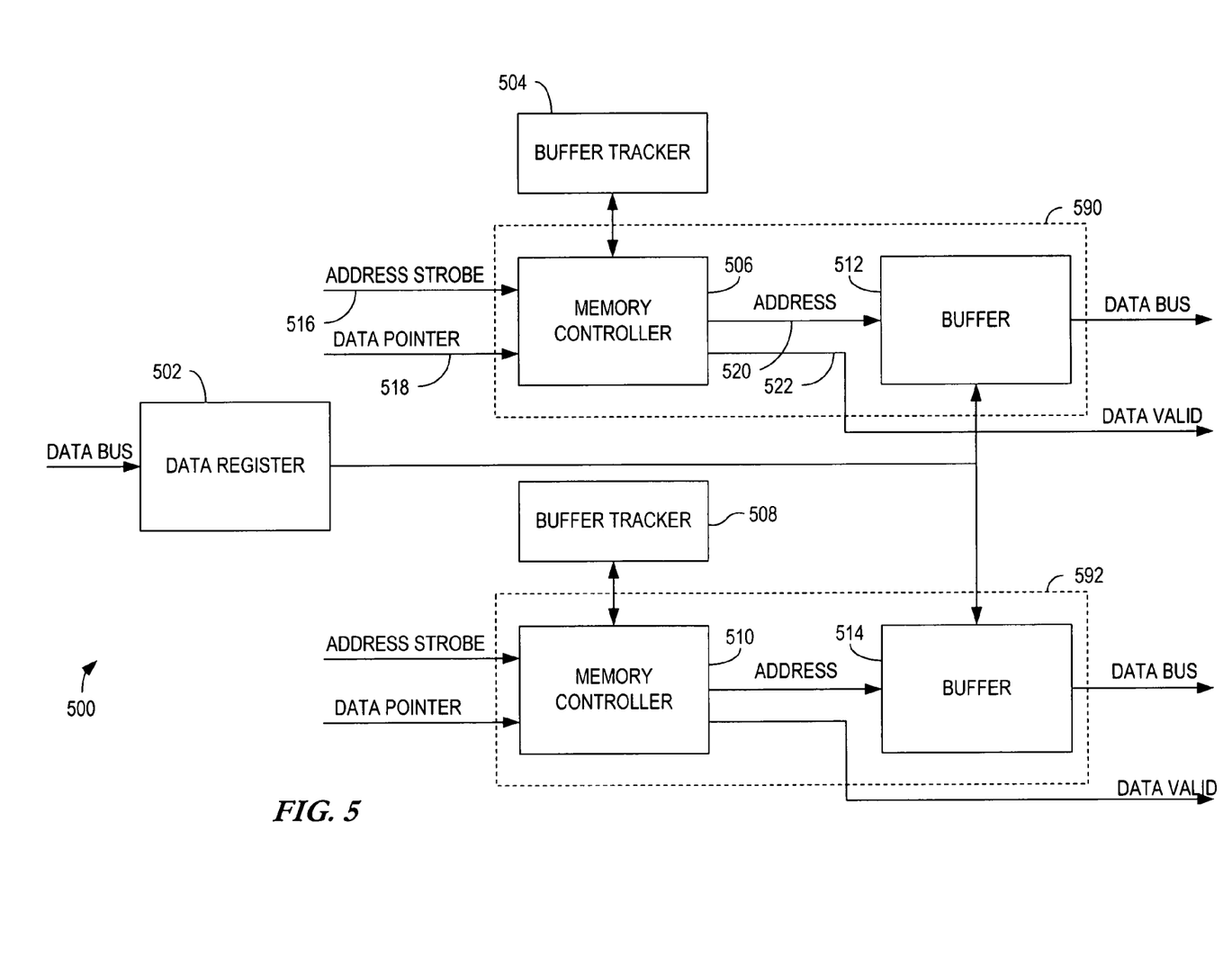
FIG. 5 illustrates a block diagram of a data controller in accordance with the present invention.

FIG. 5 illustrates an exemplary block diagram of Data Controller 500 according to the present invention. Data Controller 500 resides within Node Controller 300 of FIG. 3 and controls data transfer from Processors 202 of FIG. 2 to Memory 208 of FIG. 2 during the data phase of Bus Interface Controller 302. Data Register 502 is coupled to the data bus portion of System Bus 338 of FIG. 3 and latches data off of System Bus 338 when data meant for Node Controller 300 of FIG. 3 is valid and available. Buffer 512 and Buffer 514 receive the data from Data Register 502 as directed by Memory Controllers 506 and 510. Buffer Trackers 504 and 508 maintain control of the apportionment of memory blocks within Buffer 512 and Buffer 514 during the snoop phase of Bus Interface Controller 302 of FIG. 3 in preparation for the data transfer to take place during the data phase of Bus Interface Controller 302 of FIG. 3. Buffer Trackers 504 and 508 work in combination with Transaction Pipeline 314 and Local/Remote Trackers 312 to allocate the buffer storage within Buffer 512 and Buffer 514 to accommodate the data transfer. The data storage, for example, may be allocated by Bus Interface Controller 302 of FIG. 3, where pointers to the allocated memory blocks are forwarded to Transaction Pipeline 314 of FIG. 3 and then on to Memory Port Interfaces 330 and 320 of FIG. 3. Once Memory Port Interface 330 and 320 are ready to receive streamed data from Buffer 512 or Buffer 514, respectively, Memory Port Interface 330 and 320 present the pointer received from Transaction Pipeline 314 of FIG. 3 to Memory Controller 506 and 510, respectively, as a data pointer. The data pointer is then used to calculate signals ADDRESS to address data blocks within Buffer 512 or 514 as the starting address of the memory block to be transferred to Memory Port Interface 330 and 320 of FIG. 3.

Once stored, the data words may be retrieved in any order from Buffer 512 by Memory Port Interface 330 of FIG. 3, or alternatively, the data words may be retrieved in any order from Buffer 514 by Memory Port Interface 320 of FIG. 3. Further, only a portion of the data block stored within Buffer 512 or Buffer 514 may be retrieved if, for example, a data hold is generated, which would ordinarily cause unnecessary delay during the data transfer. In this instance, for example, a data stream from Buffer 512 to Memory Port Interface 330 that is delayed may be temporarily postponed, while a data stream from Buffer 514 to Memory Port Interface 320 is allowed to complete. Once the data stream from Buffer 514 to Memory Port Interface 320 is completed, the temporarily postponed data stream from Buffer 512 to Memory Port Interface 330 may then be completed. It can be said that Data Buffer 512 and Memory Controller 506 comprise a primary data path 590 through Data Controller 500 and that Data Buffer 514 and Memory Controller 510 comprise a secondary data path 592 through Data Controller 500.

Figure 6:
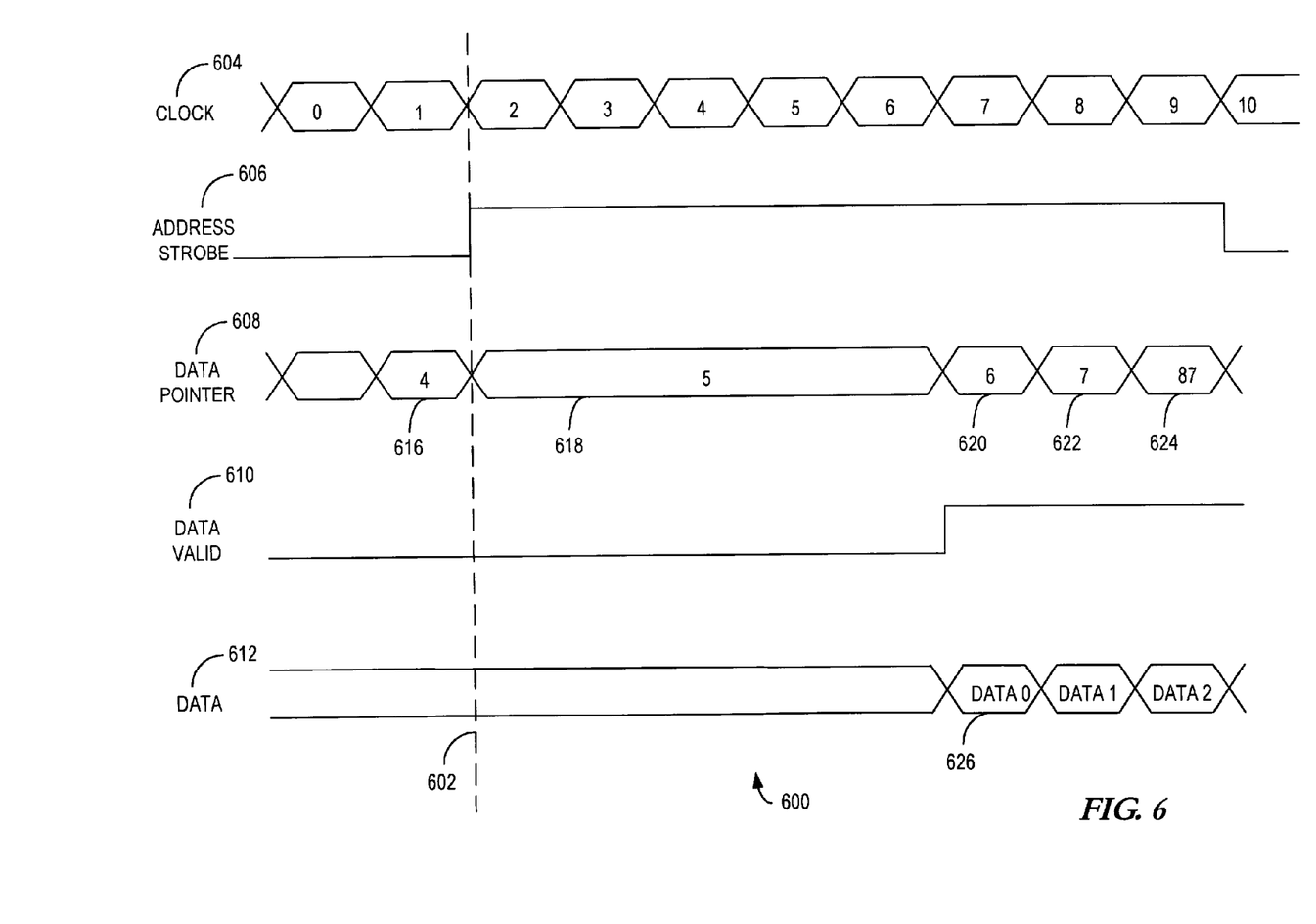
FIG. 6 illustrates a timing diagram in accordance with the present invention.

In order to illustrate the function of the present invention according to one embodiment of the invention, the timing diagram of FIG. 6 is used. Data transfers are discussed in relation to Memory Controller 506 and Buffer 512 of FIG. 5, but it should be noted that data transfers in relation to Memory Controller 510 and Buffer 514 of FIG. 5 are conducted in similar manner. Clock 604 represents the bus clock used to synchronize bus transactions on System Bus 338 as well as any other process performed by Node Controller 300 of FIG. 3. Data pointer 608 represents the pointer received from Transaction Pipeline 314 of FIG. 3 during, for example, the snoop phase of Bus Interface Controller 302 of FIG. 3. Once ready, Memory Port Interface 330 of FIG. 3 presents data pointer 616 to Memory Controller 506 of FIG. 5 and without acknowledgment, presents data pointer 618 to Memory Controller 506 of FIG. 5. That is to say, that Memory Port Interface 330 of FIG. 3 streams address information to Memory Controller 506 of FIG. 5 in the form of data pointers 618 and 616 without acknowledgment. Once data pointer 616 has been streamed to Memory Controller 506 of FIG. 5, Address Strobe 606 is asserted, at the same time that data pointer 618 is streamed, leaving 2 outstanding data pointers to be processed by Memory Controller 506 and Buffer 512, for example, of FIG. 5.

Data Pointer 616 represents the particular word within the data block that is requested by Memory Port Interface 330 of FIG. 3. With reference to FIG. 6, for example, Data Pointer 616 indicates that word 0 of data block address 4 is requested by Memory Port Interface 330 of FIG. 3. The data pointer address is strobed into Memory Controller 506 of FIG. 5 by Address Strobe 606 at time 602. During the valid duration of Address Strobe 606, other data pointers are streamed into Memory Controller 506 of FIG. 5 from Memory Port Interface 330 of FIG. 3, such as Data Pointers 618 through 624, where Data Pointer 618 indicates that word 1 of data block address 4 is requested, Data Pointer 620 indicates that word 2 of data block address 4 is requested, etc.

It should be noted that at time 602, Data Pointer 618 is requested by Memory Port Interface 330 of FIG. 3, but is held because Data Valid 610 has not yet asserted. Data Pointer 618, in other words, remains static until the beginning of clock cycle 7, which is due to the delay experienced in retrieving Data 626 from Buffer 512 of FIG. 5. This delay, or stall, illustrates one advantage of the present invention because during the stall, for example, Memory Port Interface 320 of FIG. 3 may stream data pointers to Memory Controller 510 of FIG. 5 to initiate data transfer from Buffer 514 of FIG. 5, while the data from Buffer 512 of FIG. 5 is being stalled. Thus, while waiting for a valid memory word to be presented by Memory Controller 506 and Buffer 512 of FIG. 5, other data may be requested from Memory Controller 510 and Buffer 514 of FIG. 5, increasing the effective data transfer rate and overall efficiency of operation during the data phase. Once the data from Memory Controller 510 and Buffer 514 of FIG. 5 has been transferred to Memory Port Interface 320 of FIG. 3, then Memory Port Interface 330 of FIG. 3 has the option to begin the data transfer where it left off before the stall occurred, or may instead request the entire memory block again.

It should also be noted that Data Valid 610 may also assert at the beginning of clock cycle 3, thus providing a non-stalled operation of Data Controller 500. In such an instance, Data Pointer 618 only remains valid for the duration of clock cycle 2, where Data Pointers 620-622 are valid during clock cycles 3 and 4, respectively, and deallocate signal 624 is valid during clock cycle 5.

Once all of the data for a particular memory block has been accessed by Memory Port Interface 330, then that portion of Buffer 512 used for the particular memory block may be deallocated and subsequently reallocated for use by another memory block. The deallocation is signaled by Memory Port Interface 330 of FIG. 3 by setting the most significant bit of Data Pointer 624 to a binary 1, i.e. $87_{HEX}$=10000111. For some transactions, however, data needs to be reused, i.e., reread. Memory Port Interface 330, therefore, will not deallocate the buffer, but leave it valid for future use, which is done by not asserting the most significant bit. If Buffer 512 is not deallocated by Memory Port Interface 330, and is determined not to be needed in the future, then Buffer Tracker 504 deallocates Buffer 512.

Figure 7:
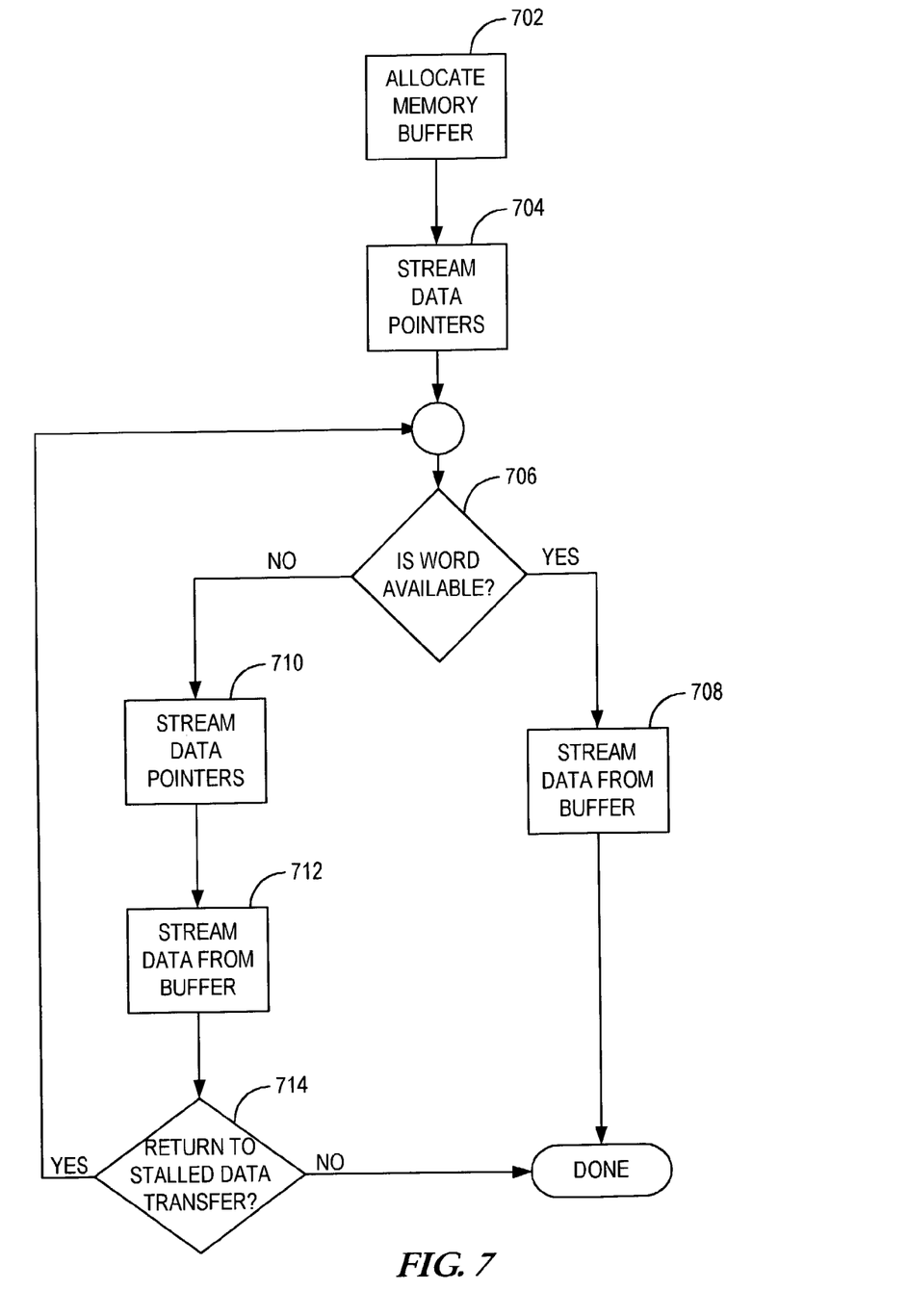
FIG. 7 illustrates a flow diagram in accordance with the present invention.

FIG. 7 illustrates an exemplary flow diagram according to the principles of the present invention. An allocation of memory from Buffers 512 or 514 is made in step 702 at, for example, the snoop phase of Bus Interface Controller 302 of FIG. 3. The memory allocation is made by Transaction Pipeline 314 of FIG. 3 and subsequently sent to Memory Port Interfaces 330 and/or 320 of FIG. 3. At the data phase of Bus Interface Controller 302, Memory Port Interfaces 330 or 320 of FIG. 3 stream data pointers to Memory Controller 506 or 510 of FIG. 5 in order to retrieve write data from Buffer 512 or 514 to be ultimately written to Memory 208 of FIG. 2. At decision 706, the memory word requested by Memory Port Interfaces 330 and 320 either is ready for transfer, has been stalled, or is busy for some reason. Branch YES of decision 706 indicates that data is ready for transfer and the data from either Buffer 512 or Buffer 514 is transferred to Memory Port Interfaces 330 or 320, respectively, of FIG. 3. Branch NO, on the other hand, indicates that data is either stalled or busy, in which case other data pointers may be streamed by an alternate memory port interface that is not stalled or busy, as in step 710. Step 710 may be executed so that the need to halt data transfer from one memory port interface is alleviated by providing an alternate memory port interface to supply the data transfer. Once the data transfer has been completed by the alternate memory port interface as in step 712, execution may return to the stalled memory port interface, where the stalled data transfer may resume or be cancelled as in decision 714. The stalled data transfer may be resumed either by restarting the data transfer from the point where the data transfer was stalled or by simply reinitiating the data transfer from the beginning.

Figure 8:
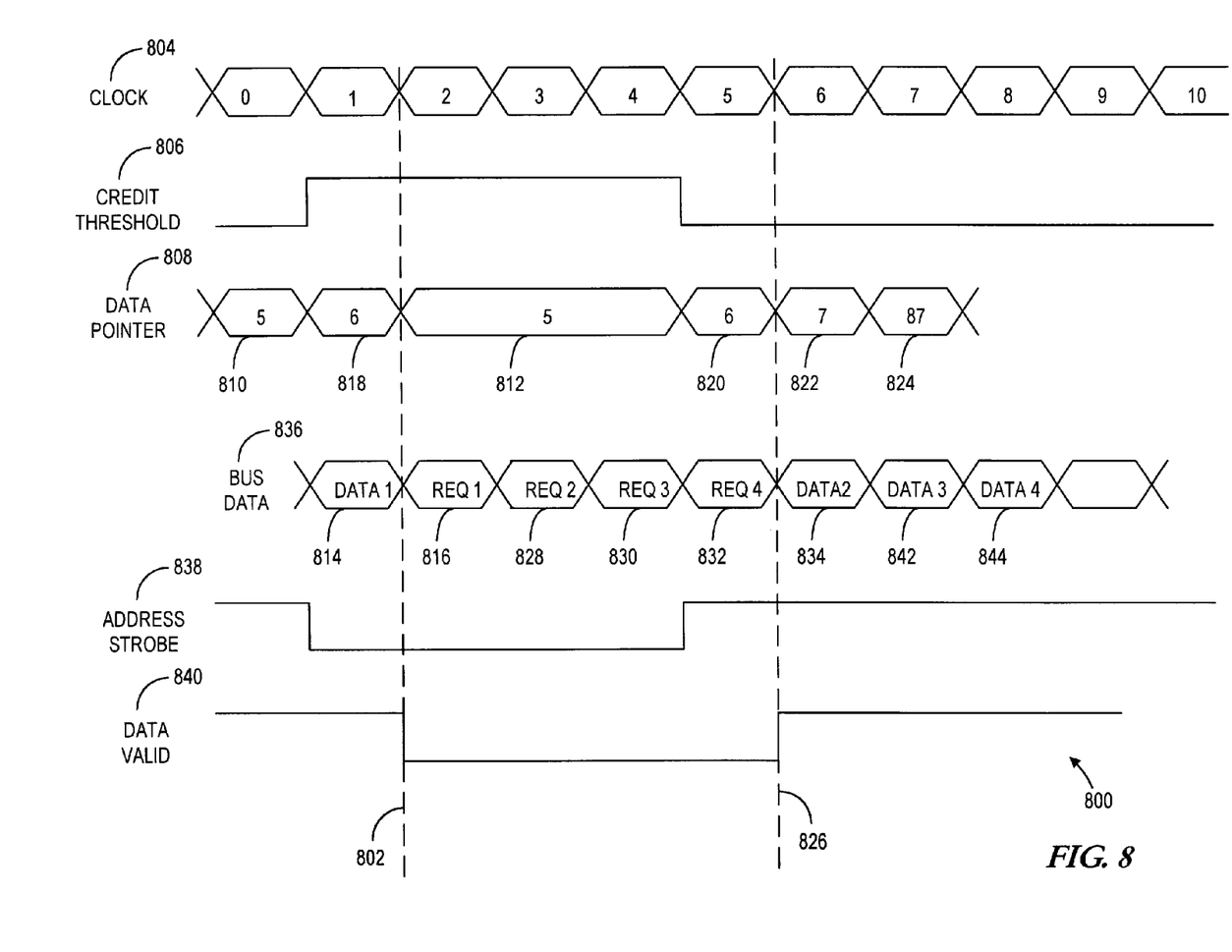
FIG. 8 illustrates a timing diagram in accordance with another embodiment of the present invention.

The timing diagram of FIG. 8 illustrates one example of when response data transfers may be stalled, but request data transfers are allowed to continue. Data Pointers 810 and 818 represent, for example, the address of a memory block requested by Memory Port Interface 330 of FIG. 3. Data Pointer 810 represents word 1 within data block address 4 and Data Pointer 818 represents word 2 within data block address 4 that is requested by Memory Port Interface 330 of FIG. 3. Data Pointers 810 and 818, however, are not strobed into Memory Controller 506 of FIG. 5, for example, due to the fact that signal Credit Threshold 806 is asserted, whereby any further response data transfer is prevented and request data transfer is given priority.

Scalability Port Mega Cell 336 and 332 of FIG. 3, for example, have a physical depth limitation which prevents any further bus to memory transfers when the depth limitation has been reached. Time 802 represents a point in time where Scalability Port Mega Cells 332 and 336 of FIG. 3 have in fact reached capacity and are unable to accept response data from either of Memory Port Interfaces 320 or 330 of FIG. 3. Signal Credit Threshold 806 is asserted, therefore, by Memory Port Interface 320 of FIG. 3 to a logic high indicating that Scalability Port Mega Cell 332 of FIG. 3 has reached capacity and no further transfers are to be received until signal Credit Threshold deasserts to logic low. At this time, Memory Port Interfaces 320 of FIG. 3 has assumed a stalled operational state for response data transfers. Credit Threshold 806, therefore, represents a throttling mechanism used by Memory Port Interface 320 of FIG. 3 to inhibit response data transfer in response to Scalability Port Mega Cells 332 having reached full capacity.

In such an instance, any pending request in Memory Port Interfaces 320 of FIG. 3 is given highest priority. At time 802, therefore, Data Pointers 810 and 818, corresponding to Data Words 834 and 842, are stalled, yielding priority for request data 816 and 828-832 to be serviced by Node Controller 300 of FIG. 3. During the time between time 802 and time 826, therefore, response data is being stalled and Memory Port Interface 320 of FIG. 3 is sending request or request data to Memory 208 of FIG. 2 instead. Once Memory 208 of FIG. 2 has accepted enough response data, Credit Threshold 806 deasserts to allow more response transfers to continue at time 826. Since Data Pointers 810 and 818 are stalled by assertion of Credit Threshold 806, they must be re-queued as Data Pointers 812 and 820, which correspond to Data Words 834 and 842, respectively.

Figure 9:
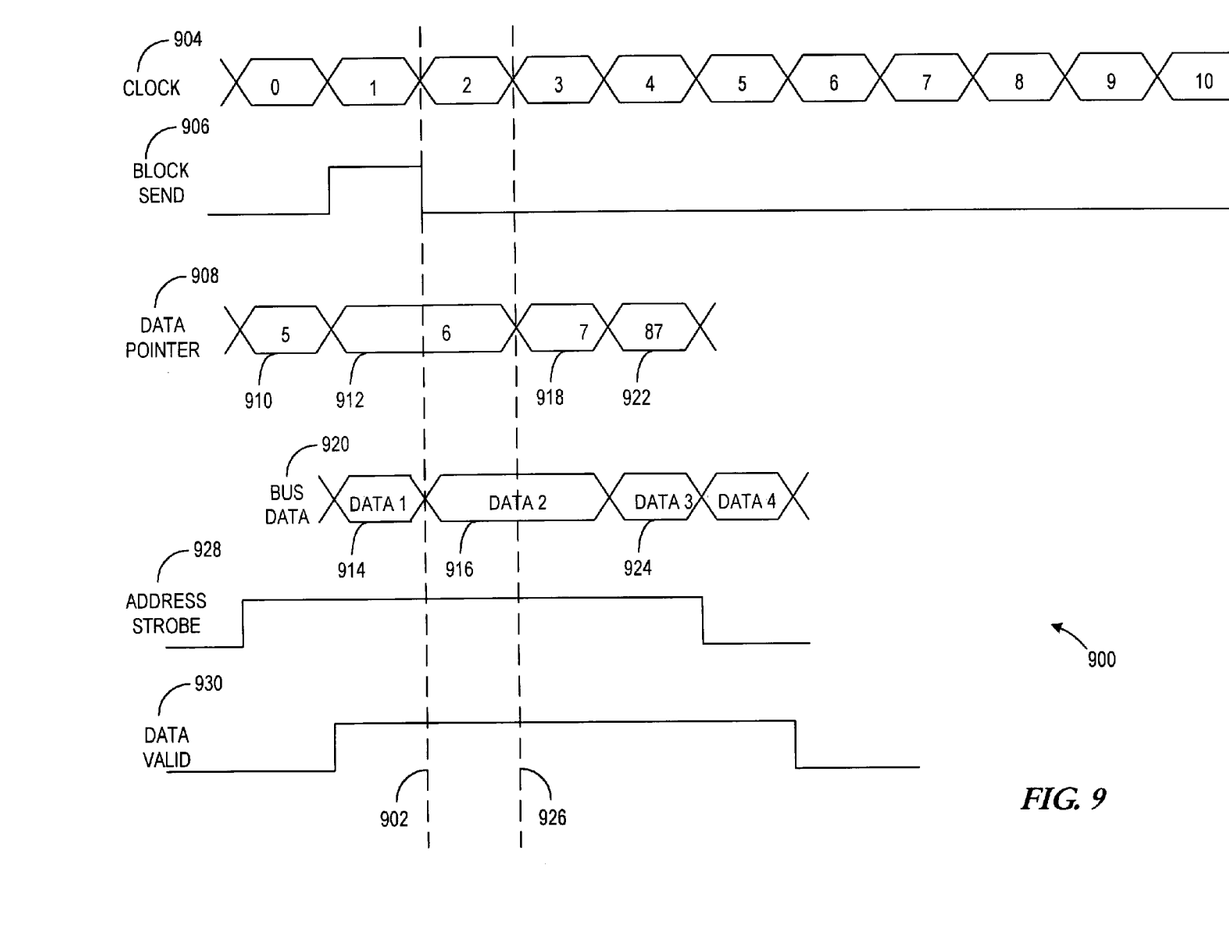
FIG. 9 illustrates a timing diagram in accordance with another embodiment of the present invention.

The diagram of FIG. 9 represents an exemplary timing diagram illustrating another embodiment of how blocking response data transfer from Node Controller 300 of FIG. 3 is accomplished. By asserting signal Block Send 906, Memory Port Interfaces 320 or 330 of FIG. 3 may block all transfers after one cycle of Clock 904. At time 902, therefore, one clock cycle has transpired since the assertion of Block Send and Data Word 916 is held, while Data word 924 remains in Write Data Queue 412 or 414 of FIG. 4. At this time, Bus Interface Controller 302 of FIG. 3 has assumed an operational state of busy in relation to the transfer of response data. At time 926, one clock cycle has transpired since signal Block Send is deasserted and normal response data transfer may once again resume. Block Send 906 may be asserted for any number of cycles of Clock 904, therefore, a throttling mechanism is effected for response data transfer by Bus Interface Controller 302 for the duration of signal Block Send 906.

A combination of signals Block Send and Credit Threshold may by used to initiate a third embodiment of data throttling, such that request data may be inserted into the normal response data flow upon assertion of signal Credit Threshold. Signal Block Send may also be asserted to establish a busy operational state for Bus Interface Controller 302 of FIG. 3, such that a combination operational state may be established resulting in a stalled response data transfer as well as a busy request data transfer.

In conclusion, a method and apparatus has been presented that allows data pointers to be streamed without acknowledgement of receiving each, thus resulting in a significant time savings. Additionally, a method and apparatus is presented which allows alternate data processing to be executed when a first data transfer process has either been stalled or is busy.

Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A method comprising:
buffering data to be written to a memory in at least a first and second buffer, wherein different data destined for the memory is provided on first and second data paths for buffering in each of the first and second buffers respectively;
providing a plurality of successive first data pointers to a first memory controller, each of the first data pointers being streamed to the first memory controller without acknowledgement of its respectively preceding first data pointer;
providing the first data pointers from the first memory controller to the first buffer and transferring data identified by the first data pointers from the first buffer;
stalling one of the data transfers from the first buffer in response to a delay experienced in retrieving preceding data from the first buffer;
providing a plurality of successive second data pointers to a second memory controller, each of the second data pointers being streamed to the second memory controller without acknowledgement of its respectively preceding second data pointer;
providing the second data pointers from the second memory controller to the second buffer and transferring data identified by the second data pointers from the second buffer in response to the stalled data transfer from the first buffer;
providing the data transfers from the first and second buffers comprise retrieving data words from the first and second buffers in any order regardless of an order of receipt and retrieving only a portion of a data block stored within the first and second buffers if a data hold is generated preventing further transfer of the data block; and
completing the stalled data transfer from the first buffer in response to completing the data transfer from the second buffer.

2. The method according to claim 1, wherein completing the stalled data transfer comprises reinstating the data transfer at a point where the first data transfer was stalled.

3. The method according to claim 1, wherein completing the stalled data transfer comprises restarting the data transfer at a point indicated by a first data pointer of the first set of data pointers.

4. The method according to claim 1, further comprising providing a plurality of second data pointers, each provided without acknowledgement of its respectively preceding second data pointer, and wherein transferring data from the second buffer comprises transferring the data identified by the second data pointers from the second buffer in response to the stalled data transfer from the first buffer.

5. The method according to claim 1, wherein the first and second data paths for buffering comprises memory control paths within a node controller that couples a plurality of processors to a memory storage interface.

6. A system for transferring first and second data types, comprising:
means for providing successive first data pointers, each provided without acknowledgement of its respectively preceding first data pointer;
first buffering means for buffering the first data type;
second buffering means for buffering the second data type;
means for transferring the first data type identified by the first data pointers from the first buffering means, configured to provide the respective first and second data types in any order regardless of an order of receipt and to transfer only portions of data blocks comprising the first data type if a data hold is generated preventing further transfer of the first data block;
means for delaying the transfer of the first data type from the first buffering means in response to a delay experienced in retrieving preceding data from the first buffering means; and
means for transferring the second data type in response to delaying the transfer of the first data type, configured to provide the respective first and second data types in any order regardless of an order of receipt and to transfer only portions of data blocks comprising the second data type if a data hold is generated preventing further transfer of the second data block.

7. The system according to claim 6, wherein the means for transferring the first data type comprises:
means for receiving pointers to the first data type without acknowledgment; and
means for providing the first data type in response to receiving the pointers.

8. The system according to claim 6, wherein the means for delaying the transfer of the first data type comprises:
means for receiving a delay signal; and
means for prioritizing transfer of the second data type in response to receiving the delay signal.

9. The system according to claim 8 wherein the means for transferring the second data type comprises:
means to retrieve the second data type from the buffer; and
means to transfer the second data type instead of the first data type.

10. The system according to claim 9 further comprising means for completing the transfer of the first data type in response to completing the transfer of the second data type.

11. An apparatus comprising:
a data register coupled to a data bus shared by a plurality of processors;
first and second data buffers coupled to the data register to receive data from the data register;
a first memory controller having an input to receive and store a plurality of streamed first data pointers without acknowledgment, and to initiate transfers of data from addresses corresponding to the first data pointers from the first buffer to a memory;
a second memory controller having an input to receive and store a plurality of streamed second data pointers without acknowledgment, and to initiate transfers of data from addresses corresponding to the second data pointers from the second buffer to the memory when the transfers of data from the first buffer have stalled in response to a delay experienced in retrieving preceding data from the first buffer;
wherein the first and second memory controllers respectively are configured to initiate the transfers from the first and second buffers in any order regardless of an order of receipt and to transfer only a portion of a data block stored within the respective first and second buffers if a data hold is generated preventing further transfer of the data block; and wherein the first memory controller resumes the transfers of data from the first buffer to the memory after the second memory controller has completed the transfers of data from the second buffer to the memory.

12. The apparatus of claim 11, wherein the first and second memory controllers are respectively coupled to the first and second data buffers to specify the data from the data register that is to be buffered in their respective first and second data buffers.

* * * * *